(12) United States Patent
Sun et al.

(10) Patent No.: US 7,022,608 B2
(45) Date of Patent: Apr. 4, 2006

(54) METHOD AND COMPOSITION FOR THE REMOVAL OF RESIDUAL MATERIALS DURING SUBSTRATE PLANARIZATION

(75) Inventors: Lizhong Sun, San Jose, CA (US); Stan Tsai, Fremont, CA (US); Shijian Li, San Jose, CA (US)

(73) Assignee: Applied Materials Inc., Santa Clara, CA (US)

( * ) Notice: Subject to any disclaimer, the term of this patent is extended or adjusted under 35 U.S.C. 154(b) by 258 days.

(21) Appl. No.: 10/419,440

(22) Filed: Apr. 21, 2003

(65) Prior Publication Data
US 2003/0216049 A1 Nov. 20, 2003

Related U.S. Application Data

(62) Division of application No. 09/729,132, filed on Dec. 1, 2000, now abandoned.

(51) Int. Cl.
*H01L 21/302* (2006.01)
(52) U.S. Cl. .................. 438/691; 438/693; 438/697; 438/698
(58) Field of Classification Search ............... 438/691, 438/692, 693, 697, 698
See application file for complete search history.

(56) References Cited

U.S. PATENT DOCUMENTS

| 4,169,337 A | 10/1979 | Payne | .................. 51/283 R |
| 4,588,421 A | 5/1986 | Payne | .................. 51/308 |
| 4,752,628 A | 6/1988 | Payne | .................. 523/122 |
| 4,867,757 A | 9/1989 | Payne | .................. 51/293 |

(Continued)

FOREIGN PATENT DOCUMENTS

EP 0 401 147 A2 5/1990

(Continued)

OTHER PUBLICATIONS

Encyclopedia of Chemical Technology, vol. 23, pp. 491-532.

(Continued)

*Primary Examiner*—Nadine G. Norton
*Assistant Examiner*—Binh X. Tran
(74) *Attorney, Agent, or Firm*—Patterson & Sheridan

(57) ABSTRACT

A method, composition, and computer readable medium for planarizing a substrate. In one aspect, the composition includes one or more chelating agents and ions of at least one transition metal, one or more surfactants, one or more oxidizers, one or more corrosion inhibitors, and deionized water. The composition may further comprise one or more agents to adjust the pH and/or abrasive particles. The method comprises planarizing a substrate using a composition including one or more chelating agents and ions of at least one transition metal. In one aspect, the method comprises processing a substrate disposed on a polishing pad including performing a first polishing process to substantially remove the copper containing material, performing a second polishing process to remove residual copper containing material, the second polishing process comprising delivering a CMP composition to the polishing pad, mixing one or more chelating agents and ions of at least one transition metal in situ with the CMP composition, and removing residual copper containing materials from the substrate surface. The invention also provides a computer readable medium bearing instructions for planarizing a substrate surface, the instructions arranged, when executed by one or more processors, to cause one or more processors to control a system to perform polishing the substrate to substantially remove copper containing material formed thereon and polishing the substrate with a CMP composition comprising one or more chelating agents and ions of at least one transition metal to remove residual copper containing material.

35 Claims, 2 Drawing Sheets

U.S. PATENT DOCUMENTS

| | | | |
|---|---|---|---|
| 5,264,010 A | 11/1993 | Brancaleoni et al. | 51/308 |
| 5,478,435 A | 12/1995 | Murphy et al. | 156/636.1 |
| 5,614,444 A | 3/1997 | Farkas et al. | 437/225 |
| 5,700,383 A | 12/1997 | Feller et al. | 216/88 |
| 5,738,574 A | 4/1998 | Tolles et al. | 451/288 |
| 5,738,800 A | 4/1998 | Hosali et al. | 216/99 |
| 5,756,398 A | 5/1998 | Wang et al. | 438/692 |
| 5,769,689 A | 6/1998 | Cossaboon et al. | 451/41 |
| 5,840,629 A | 11/1998 | Carpio | 438/692 |
| 5,863,838 A | 1/1999 | Farkas et al. | 438/693 |
| 5,876,508 A | 3/1999 | Wu et al. | 134/2 |
| 5,911,835 A | 6/1999 | Lee et al. | 134/1.3 |
| 5,932,486 A | 8/1999 | Cook et al. | 438/692 |
| 5,958,794 A | 9/1999 | Bruxvoort et al. | 438/692 |
| 5,981,454 A | 11/1999 | Small | 510/175 |
| 6,033,993 A | 3/2000 | Love, Jr. et al. | 438/745 |
| 6,042,741 A | 3/2000 | Hosali et al. | 252/79.1 |
| 6,054,379 A | 4/2000 | Yau et al. | 438/623 |
| 6,063,306 A | 5/2000 | Kaufman et al. | 252/79.4 |
| 6,068,879 A | 5/2000 | Pasch | 427/97 |
| 6,077,337 A | 6/2000 | Lee | 106/3 |
| 6,083,838 A * | 7/2000 | Burton et al. | 438/691 |
| 6,083,840 A | 7/2000 | Mravic et al. | 438/693 |
| 6,096,652 A | 8/2000 | Watts et al. | 438/692 |
| 6,117,775 A | 9/2000 | Kondo et al. | 438/690 |
| 6,117,779 A | 9/2000 | Shelton et al. | 438/692 |
| 6,117,783 A | 9/2000 | Small et al. | 438/693 |
| 6,199,933 B1 | 3/2001 | Gielda | 296/96.14 |
| 6,238,592 B1 * | 5/2001 | Hardy et al. | 252/79.1 |
| 6,348,725 B1 | 2/2002 | Cheung et al. | 257/642 |
| 6,451,697 B1 | 9/2002 | Sun et al. | 438/691 |
| 6,524,167 B1 | 2/2003 | Tsai et al. | 451/41 |
| 6,569,349 B1 | 5/2003 | Wang et al. | 252/79.1 |
| 6,592,433 B1 * | 7/2003 | Buehler | 451/36 |
| 2001/0004538 A1 | 6/2001 | Li et al. | 438/200 |
| 2001/0055880 A1 | 12/2001 | Li et al. | 438/690 |
| 2002/0090820 A1 | 7/2002 | Sun et al. | 438/690 |
| 2003/0022801 A1 | 1/2003 | Sun et al. | 510/175 |

FOREIGN PATENT DOCUMENTS

| | | |
|---|---|---|
| EP | 0 401 147 | 12/1990 |
| EP | 0 913 442 A2 | 5/1999 |
| WO | 98/49723 | 11/1998 |
| WO | 99/53532 | 10/1999 |
| WO | WO 99/53532 * | 10/1999 |
| WO | 00/30159 | 5/2000 |
| WO | 00/36037 | 6/2000 |
| WO | 00/49647 | 8/2000 |
| WO | 00/53691 | 9/2000 |
| WO | 02/20682 A2 | 3/2002 |

OTHER PUBLICATIONS

PCT International Search Report dated Jul. 30, 2002.
PCT International Search Report dated Apr. 30, 2003.
U.S. Appl. No. 09/698,864, filed on Oct. 27, 2000.
U.S. Appl. No. 09/608,078, filed on Jun. 30, 2000.
U.S. Appl. No. 09/543,777, filed on Apr. 5, 2000.
Brusic, V., et al. "Cooper Corrosion With and Without Inhibitors", Electronchem Soc., 138;8, 2253-2259, Aug. 1991.
U.S. Appl. No. 09/569,968, filed on May 11, 2000.

* cited by examiner

METHOD AND COMPOSITION FOR THE REMOVAL OF RESIDUAL MATERIALS DURING SUBSTRATE PLANARIZATION

CROSS-REFERENCE TO RELATED APPLICATIONS

This application is a divisional of co-pending U.S. patent application Ser. No. 09/729,132, filed Dec. 1, 2000, now abandoned, which is herein incorporated by reference.

BACKGROUND OF THE INVENTION

1. Field of the Invention

The present invention relates generally to the fabrication of semiconductor devices and to chemical mechanical polishing and planarization of semiconductor devices.

2. Description of the Related Art

In the fabrication of integrated circuits and other electronic devices, multiple layers of conducting, semiconducting, and dielectric materials are deposited on or removed from a surface of a substrate. Thin layers of conducting, semiconducting, and dielectric materials may be deposited by a number of deposition techniques. Common deposition techniques in modern processing include physical vapor deposition (PVD), also known as sputtering, chemical vapor deposition (CVD), plasma-enhanced chemical vapor deposition (PECVD), and now electrochemical plating (ECP).

As layers of materials are sequentially deposited and removed, the uppermost surface of the substrate may become non-planar across its surface and require planarization. Planarizing a surface, or "polishing" a surface, is a process where material is removed from the surface of the substrate to form a generally even, planar surface. Planarization is useful in removing undesired surface topography and surface defects, such as rough surfaces, agglomerated materials, crystal lattice damage, scratches, and contaminated layers or materials. Planarization is also useful in forming features on a substrate by removing excess deposited material, such as copper containing material, used to fill the features and to provide an even surface for subsequent levels of metallization and processing.

Chemical mechanical planarization, or chemical mechanical polishing (CMP), is common technique used to planarize substrates. CMP utilizes a chemical composition, typically a slurry or other fluid medium, for selective removal of material from substrates. In conventional CMP techniques, a substrate carrier or polishing head is mounted on a carrier assembly and positioned in contact with a polishing pad in a CMP apparatus. The carrier assembly provides a controllable pressure to the substrate urging the substrate against the polishing pad. The pad is moved relative to the substrate by an external driving force. Thus, the CMP apparatus effects polishing or rubbing movement between the surface of the substrate and the polishing pad while dispersing a polishing composition, or slurry, to effect both chemical activity and mechanical activity.

Conventional CMP processes are performed using an abrasive article, such as a polishing composition, or slurry, containing abrasive particles in a reactive solution with a conventional polishing pad. Alternatively, the abrasive article can be a fixed abrasive article, such as a fixed abrasive polishing pad, which may be used with a, CMP composition or slurry that does not contain abrasive particles, often referred to as an abrasive free composition. A fixed abrasive article typically comprises a backing sheet with a plurality of geometric abrasive composite elements adhered thereto. Alternatively, the CMP processes can be performed in the absence of an abrasive article, such as by the use of an abrasive free composition with a conventional polishing pad.

Conventionally, in polishing substrate features, such as a dual damascenes features formed by the deposition of a barrier layer in an aperture and, for example, a copper containing material disposed on the barrier layer, excess copper containing material is polished to the barrier layer, and then the barrier layer is polished to the underlying dielectric layer to form the feature. Excess copper containing material is broadly defined herein copper containing material deposited on the substrate in an amount more than sufficient to substantially fill features formed on the substrate surface. Generally, all of the excess copper containing material is removed from the surface of the barrier layer prior to polishing the barrier layer.

However, the interface between the copper containing material and the barrier layer is generally non-planar and is difficult to sufficiently remove all of the excess copper containing material. Additionally, the copper containing material polishing process often removes the excess copper containing material and the barrier materials at different rates which may result in the formation of topographical defects in the substrate surface while still not sufficiently removing excess copper containing material from the barrier layer. Further, some polishing compositions, such as some abrasive free polishing compositions, have difficulty removing a satisfactory amount of excess copper containing material from the substrate surface. As such, many copper removal processes result in residual copper containing material being retained on the barrier layer and substrate surface. The retention of residual copper containing material has been observed to detrimentally affect subsequent polishing processes and detrimentally affect the polish quality of the substrate surface.

One method to ensure removal of all the excess copper containing material before removing the barrier material is to overpolish the deposited copper containing material. Overpolishing may result in dishing of the copper containing material in the features formed on the surface of the substrate. Dishing occurs when a portion of the surface of a metal deposited in an aperture or other substrate structure formed in a dielectric layer is excessively polished resulting in the formation topographical defects, such as concavities or depressions in the copper containing material on the substrate surface, and can further lead to non-uniform removal of the barrier layer disposed thereunder. Dishing performance is used to describe the ability of a CMP composition or process to polish and planarize a surface without dishing or with reduced dishing of the surface. Additionally, in some CMP composition, such as some abrasive free compositions, the application of overpolishing techniques have not been completely successful in removing all of the excess copper containing material from the surface of the substrate.

Therefore, there exists a need for a method and CMP composition that reduces or removes residual copper containing materials during CMP processing.

SUMMARY OF THE INVENTION

The invention generally provides a method, composition, and computer readable medium for planarizing a substrate surface to remove copper containing material from a substrate surface in order to have a substrate surface free or substantially free of residual copper containing material. In one aspect, the invention provides a composition for planarizing a substrate, the composition comprising ions of at least one transition metal, one or more chelating agents, one or more surfactants, one or more oxidizers, one or more corrosion inhibitors, water, and combinations thereof. The composition may further include an agent to adjust the pH of the composition and/or abrasive particles.

In another aspect, the invention provides a method for removing residual copper containing materials from a substrate surface, the method comprising planarizing the substrate surface using a composition including one or more chelating agents and ions of at least one transition metal. The composition may further comprise one or more chelating agents, one or more surfactants, one or more oxidizers, one or more corrosion inhibitors, water, and combinations thereof. The composition may further include an agent to adjust the pH of the composition and/or abrasive particles.

In another aspect, the invention provides a method for processing a substrate, comprising providing a substrate to a polishing apparatus, polishing the substrate to substantially remove copper containing material formed thereon, and polishing the substrate with a CMP composition including one or more chelating agents and one or more copper salts to remove residual copper containing material.

Another aspect of the invention provides a method for processing a substrate disposed on a polishing pad, comprising performing a first polishing process on a substrate to substantially remove the copper containing material formed thereon, performing a second polishing process to remove residual copper containing material, the second polishing process comprising delivering a CMP composition to the polishing pad, mixing one or more chelating agents and ions of at least one transition metal in situ with the CMP composition, and removing residual copper containing materials from the substrate surface.

Another aspect of the invention provides a computer readable medium bearing instructions for planarizing a substrate surface, the instructions arranged, when executed by one or more processors, to cause one or more processors to control a system to perform polishing the substrate to substantially remove copper containing material formed thereon and polishing the substrate with a CMP composition comprising one or more chelating agents and ions of at least one transition metal to remove residual copper containing material.

BRIEF DESCRIPTION OF THE DRAWINGS

So that the manner in which the above recited features, advantages and objects of the present invention are attained and can be understood in detail, a more particular description of the invention, briefly summarized above, may be had by reference to embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The invention will be described below in reference to a planarizing process and compositions that can be carried out using chemical mechanical polishing process equipment, such as the Mirra® CMP System available from Applied Materials, Inc., as shown and described in U.S. Pat. No. 5,738,574, entitled, "Continuous Processing System for Chemical Mechanical Polishing," the entirety of which is incorporated herein by reference to the extent not inconsistent with the invention. Although, the CMP processes and compositions are illustrated utilizing the Mirra® CMP System, any system enabling polishing of substrates using the compositions and methods described herein can be used to advantage. The following apparatus description is illustrative and should not be construed or interpreted as limiting the scope of the invention.

Figure 1:
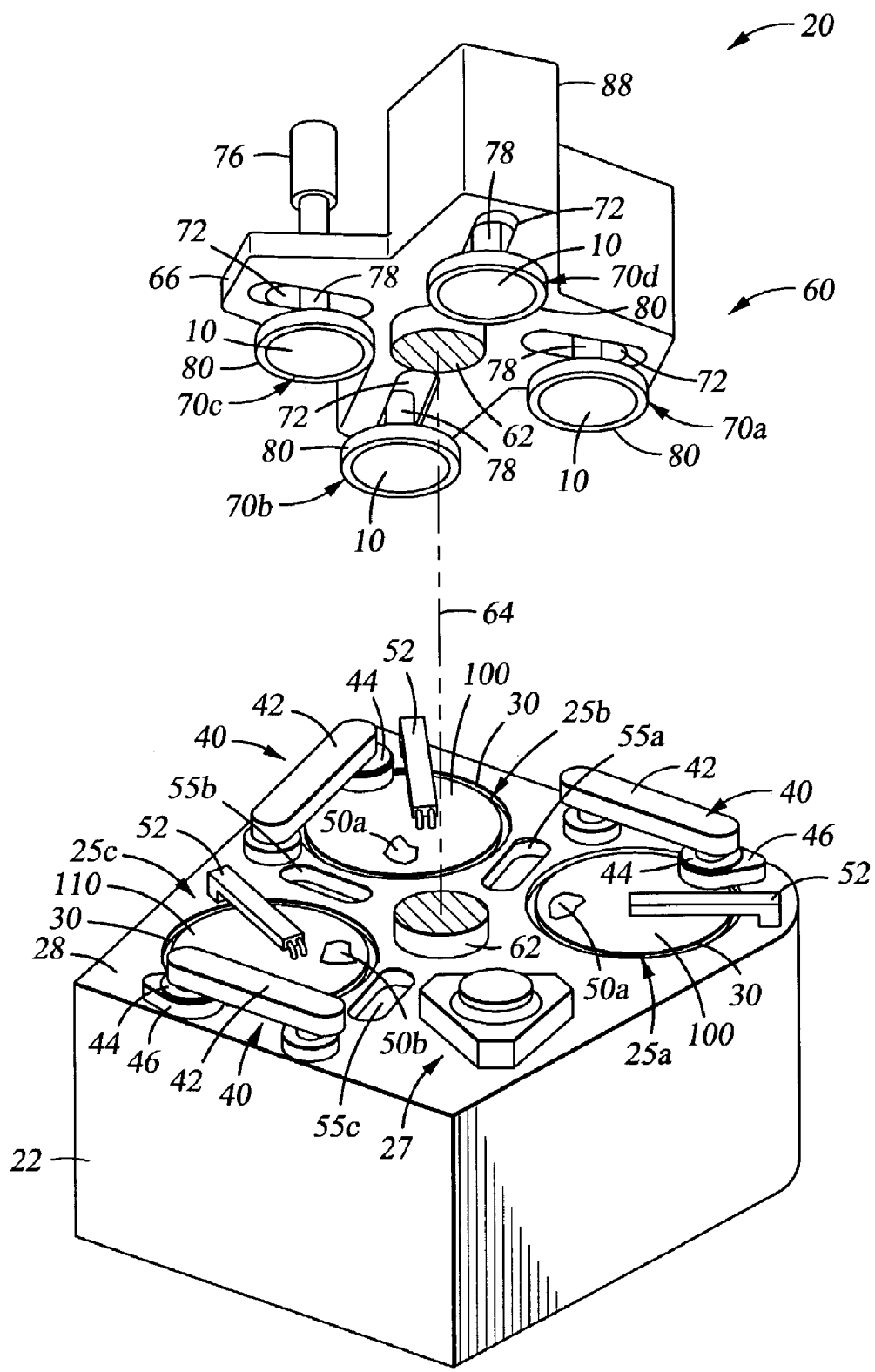
FIG. 1 is a schematic perspective view of a chemical mechanical polishing apparatus.

FIG. 1 is a schematic perspective view of a chemical mechanical polishing apparatus 20. The polishing apparatus 20 includes a lower machine base 22 with a table top 28 mounted thereon and a removable outer cover (not shown). The table top 28 supports a series of polishing stations, including a first polishing station 25a, a second polishing station 25b, a final polishing station 25c, and a transfer station 27. The transfer station 27 serves multiple functions, including, for example, receiving individual substrates 10 from a loading apparatus (not shown), washing the substrates, loading the substrates into carrier heads 80, receiving the substrates 10 from the carrier heads 80, washing the substrates 10 again, and transferring the substrates 10 back to the loading apparatus.

Each polishing station 25a–25c includes a rotatable platen 30 having a polishing pad 100 or 110 disposed thereon. Each platen 30 may be a rotatable aluminum or stainless steel plate connected to a platen drive motor (not shown). The polishing stations 25a–25c may include a pad conditioner apparatus 40. The pad conditioner apparatus 40 has a rotatable arm 42 holding an independently rotating conditioner head 44 and an associated washing basin 46. The pad conditioner apparatus 40 maintains the condition of the polishing pad so that it will effectively polish the substrates. Each polishing station may include a conditioning station if the CMP apparatus is used with other pad configurations.

The polishing stations 25a–25c may each have a slurry/rinse arm 52 that includes two or more supply tubes to provide one or more chemical compositions or slurries, chemical components, and/or water to the surface of the polishing pad. The slurry/rinse arm 52 delivers the one or more chemical slurries in amounts sufficient to cover and wet the entire polishing pad. Each slurry/rinse arm 52 also includes several spray nozzles (not shown) that can provide a high-pressure fluid rinse on to the polishing pad at the end of each polishing and conditioning cycle.

In one aspect of the invention, the slurry/rinse arm 52 includes a supply tube to provide a CMP composition to the polishing pad, and one or more additional supply tubes to provide additives or additional CMP composition components, such as one or more chelating agents or one or metal salts, to the polishing pad. The use of additional supply lines allows one or more chelating agents and/or one or metal salts to be mixed in situ with the CMP composition in the slurry/rinse arm 52 at the point of use or mixing of one or more chelating agents and/or one or metal salts with the CMP composition on the polishing pad during spraying of the CMP composition and additives through the spray nozzles.

Further, the use of additional supply lines allows individual components such as the one or more chelating agents and/or one or metal salts to be provided independently from one another to the polishing pad which provides control of the respective concentration of the additives in the CMP composition formed in situ at the point of use. Further, the use of multiple supply lines allows the use of multiple CMP composition in serial, such as an initial composition being provided to the polishing pad and a second CMP composition having one or more additives as described herein provided to the polishing pad.

Furthermore, two or more intermediate washing stations 55a, 55b, and 55c may be positioned between adjacent polishing stations 25a, 25b, and 25c to clean the substrate as it passes from one station to the next. While not shown, multiple supply tubes can be connected to the slurry/rinse arm for mixing at the slurry/rinse prior to delivery to the polishing pad. This allows in situ mixing of various compounds at the point of use.

A rotatable multi-head carousel 60 is positioned above the lower machine base 22. The carousel 60 includes four carrier head systems 70a, 70b, 70c, and 70d. Three of the carrier head systems receive or hold the substrates 10 by pressing them against the polishing pads 100 or 110 disposed on the polishing stations 25a–25c. One of the carrier head systems 70a–70d receives a substrate from and delivers a substrate 10 to the transfer station 27. The carousel 60 is supported by a center post 62 and is rotated about a carousel axis 64 by a motor assembly (not shown) located within the machine base 22. The center post 62 also supports a carousel support plate 66 and a cover 88.

The four carrier head systems 70a–70d are mounted on the carousel support plate 66 at equal angular intervals about the carousel axis 64. The center post 62 allows the carousel motor to rotate the carousel support plate 66 and orbit the carrier head systems 70a–70d about the carousel axis 64.

Each carrier head system 70a–70d includes one carrier head 80. A carrier drive shaft 78 connects a carrier head rotation motor 76 (shown by the removal of one quarter of the cover 68) to the carrier head 80 so that the carrier head 80 can independently rotate about its own axis. There is one carrier drive shaft 78 and motor 76 for each head 80. In addition, each carrier head 80 independently oscillates laterally in a radial slot 72 formed in the carousel support plate 66.

The carrier head 80 performs several mechanical functions. Generally, the carrier head 80 holds the substrate 10 against the polishing pad 100 or 110, evenly distributes a downward pressure across the back surface of the substrate 10, transfers torque from the drive shaft 78 to the substrate 10, and ensures that the substrate 10 does not slip out from beneath the carrier head 80 during polishing operations. A retaining ring (not shown) may be disposed on the carrier head to restrict lateral movement of the substrate as it is pressed against the polishing pad during polishing of the substrate on the polishing pad. The retaining ring includes an inner surface which contacts the substrate and a lower face which is in intimate contact with the polishing pad and polishing composition. Contact with the polishing pad can results in erosion of the retaining ring's lower surface. The retaining ring may comprise a ceramic, such as alumina, or comprise a metal, such as copper or a copper alloy.

Chemical Mechanical Polishing Process and Composition.

Planarizing processes and compositions are provided to reduce or remove residual copper containing materials from a substrate surface being processed. In one aspect of the invention, one or more chelating agents and ions of at least one transition metal, such as metal ions derived from one or more metal salts, e.g., copper salts, are added to a chemical mechanical polishing composition. In one aspect of the invention, the one or more chelating agents and ions of at least one transition metal are added or mixed in situ with a CMP composition being applied to a polishing pad for polishing a substrate surface. Such an in situ mixed CMP composition may include one or more chelating agents, ions of at least one transition metal, one or more surfactants, one or more chelating agents, one or more oxidizers, one or more corrosion inhibitors, and deionized water. The CMP composition may also further include a pH adjusting agent and/or abrasive particles. The CMP composition is used in one aspect of the invention to remove excess copper containing material deposited to fill features formed on a substrate surface.

The one or more chelating agents may include compounds having one or more amine or amide groups, such as ethylenediaminetetraacetic acid, ethylenediamine or methylformamide. The one or more chelating agents may also include amino acids or amino acid derivatives, such as glycine, and carboxylic acids having one or more acids groups, such as citric acid or maleic acid. The one or more chelating agents can be present in an amount between about 0.02 volume percent (vol %) and about 4.0 vol % of the CMP composition. In one aspect of the invention, the chelating agent comprises between about 0.2 wt. % and about 1.5 wt. % of the CMP composition. The chelating agent chemically reacts with metal ions, such as from a metal salt, to form a metal complex which improves removal of material removed from the substrate surface.

In one aspect of the invention, the one or more chelating agents described above may be added to a CMP composition containing one or more chelating agents. The one or more chelating agents contained in the CMP composition may include those described above for the one or more chelating agents added to the CMP composition. The chelating agents added to the CMP composition may comprise the same chelating agent as in the CMP composition. For example, ethylenediamine may be added with a metal salt to a CMP composition already containing ethylenediamine as a chelating agent. Alternatively, the one or more chelating agents of the composition may be different chelating agents than those added to the composition. For example, ethylenediamine and a metal salt may be added to a CMP composition having citric acid as a chelating agent.

The ions of at least one transition metal may be derived from metal salts, such as copper salts, and are added to the composition to form a complex with the one or more chelating agents. The resulting complex improves removal of residual copper containing material from the substrate surface. Examples of suitable copper salts include copper sulfate, copper fluoborate, copper gluconate, copper sulfamate, copper sulfonate, copper pyrophosphate, copper chloride, copper cyanide, and combinations thereof. The copper salt can comprise a concentration between about 0.005 weight percent (wt. %) and about 1.0 wt. % of the CMP composition. Alternatively, the copper salts may be present in the CMP composition at a concentration between about 0.05 wt. % and about 0.2 wt. % of the CMP composition.

The surfactant may include one or more surfactants including anionic surfactants, Zweitter-ionic surfactants, multi-ionic surfactants, and combinations thereof. Surfactants are added to reduce or minimize re-deposition of the metal residues. Zweitter-ionic surfactants are described broadly herein as surfactants having both anionic and cationic functional groups, and which may have anionic and cationic properties in solutions, such as CMP compositions. Multi-ionic surfactants are defined herein as compounds which have multiple ionic groups in one molecule and which reduce the surface tension of the composition. Multi-ionic surfactants, such as dispersers, may also promote uniform and maximum separation of solids, such as by-products of the CMP process and abrasive particles in a composition.

Examples of surfactants include sodium salts of polyacrylic acid, e.g., comprising molecular weights from about 1,000 to about 20,000, potassium oleate, sulfosuccinates, sulfosuccinate derivatives, sulfonated amines, sulfonated amides, sulfates of alcohols, alkylanyl sulfonates, carboxylated alcohols, alkylamino propionic acids, alkyliminodipropionic acids, and combinations thereof. The anionic surfactants include potassium oleate, sulfosuccinates, sulfosuccinate derivatives, sulfates of alcohols, alkylanyl sulfonates, carboxylated alcohols, and combinations thereof. The Zweitter-ionic surfactants include sulfonated amines, sulfonated amides, alkylamino propionic acids, alkyliminodipropionic acids, and combinations thereof. The dispersers include sodium salts of polyacrylic acid, e.g., comprising molecular weights from about 1,000 to about 20,000. It is contemplated that other anionic surfactants, Zweitter surfactants, and multi-ionic surfactants may be used and the above described surfactants are illustrative and should not be construed or interpreted as limiting the scope of the invention.

The one or more surfactants can comprise a concentration between about 0.001 vol % and about 10 vol % of the CMP composition. A concentration between about 0.05 vol % and about 3 vol % of the surfactants is used in one embodiment of the CMP composition. CMP composition having between about 0.1 vol % and about 1 vol % may also be used.

The oxidizers can be any of various conventional oxidizers employed in CMP compositions and processes, such as hydrogen peroxide, ferric nitrate, or other compounds such as iodates. The oxidizers can be present in an amount between about 0.2 vol % and about 8.0 vol % of the CMP composition. A concentration between about 0.2 wt. % and about 8 wt. % of the oxidizers is used in one embodiment of the CMP composition.

Examples of corrosion inhibitors include any various organic compounds containing an azole group, such as benzotriazole, mercaptobenzotriazole, or 5-methyl-1-benzotriazole. The corrosion inhibitors can be present in an amount between about 0.02 vol % and about 1.0 vol % of the CMP composition.

The pH adjusting agent or agents can be present in an amount sufficient to adjust the pH of the CMP composition to a range between about 2.5 and about 11 and can comprise any of various bases, such as potassium hydroxide (KOH) or inorganic and/or organic acids, such as acetic acid, phosphoric acid, or oxalic acid. However, other chelating agents, oxidizers, corrosion inhibitors, and pH adjusting agents are contemplated for use with the invention. The above specified components are illustrative and should not be construed as limiting the invention.

Alternatively, embodiments of the invention may include adding abrasive particles to polishing compositions containing the one or more surfactants described herein for planarizing a substrate surface. The compositions containing abrasives particles may comprise an abrasive particle concentration of about 35 wt. % or less of the composition. Alternatively, a concentration between about 2 wt. % or less of abrasive particles is included in CMP compositions containing the one or more surfactants described herein. One example of a CMP composition having abrasive particles includes a colloidal suspension of silica (silicon oxide) particles, with, for example, an average size between about 20 nm and about 100 nm. Other forms of silica may be used including fumed silica having a particle size between about 100 nm and about 300 nm. Other abrasive components which may be used in CMP compositions include, but are not limited to, alumina, zirconium oxide, titanium oxide, cerium oxide, or any other abrasives known in the art and used in conventional CMP compositions.

In one embodiment of the invention described above, one or more chelating agents and one or more metal salts are added to a CMP composition used to reduce or remove residual copper containing material during polishing of a substrate surface. An example of a CMP composition described herein includes adding ethylenediamine to a concentration between about 0.2 vol % and about 1.5 vol % of the CMP composition performing the polishing process and adding copper sulfate to a concentration between about 0.05 wt. % and about 0.2 wt. % of the CMP composition performing the polishing process to a CMP composition including between about 0.05 vol % and about 0.4 vol % of sodium polymethacrylate, between about 0.2 vol % and about 1.5 vol % of ethylenediamine, between about 0.5 vol % and about 5.0 vol % hydrogen peroxide as the oxidizer, between about 0.02 vol % and about 0.3 vol % benzotriazole as the corrosion inhibitor, and phosphoric acid as the pH adjusting agent to produce a pH level between about 4 and about 8, and distilled water.

One example of a CMP process employs a polishing pressure between about 1 and about 8 psi, and a platen speed of about 20 to 120 rpm for a polishing duration of about 30 seconds to 2,000 seconds in the apparatus described above and shown in FIG. 1. The above described embodiment of the composition may contain about 1 wt. % or less of abrasive particles and be considered an abrasive free composition.

Additionally, The CMP compositions and processes described herein may remove layers and materials of aluminum, doped aluminum, nickel, doped nickel, tungsten, tungsten nitride, titanium, titanium nitride, and combinations thereof. It is further contemplated that other materials, including titanium-tungsten (TiW), titanium silicon nitride (TiSiN), tungsten silicon nitride (WSiN), and silicon nitride used for forming barrier layers with conductive materials, such as copper, may be removed by aspects of the invention.

While the following description refers to the removal of copper containing materials with a composition containing the one or more chelating agents and one or more copper salts, the invention contemplates the removal of conductive material, such as aluminum, by compositions including metal salts, such as the copper salts described herein, and chelating agents. Further, the invention contemplates polishing copper containing materials with a combination of copper salts and non-copper salts with the one or more chelating agents and compositions described herein.

Figure 2:
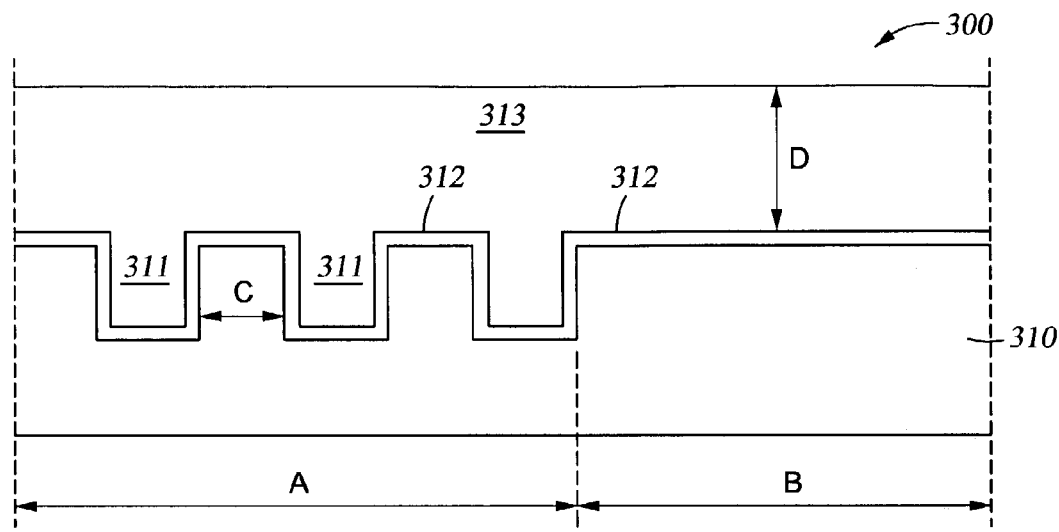
FIGS. 2–4 are schematic diagrams illustrating one embodiment of a process for forming a feature on a substrate.
Figure 3:
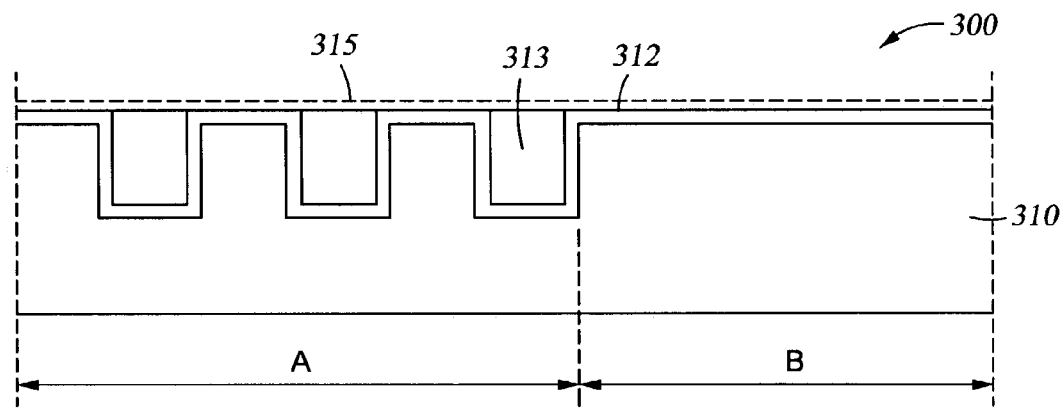
Figure 4:
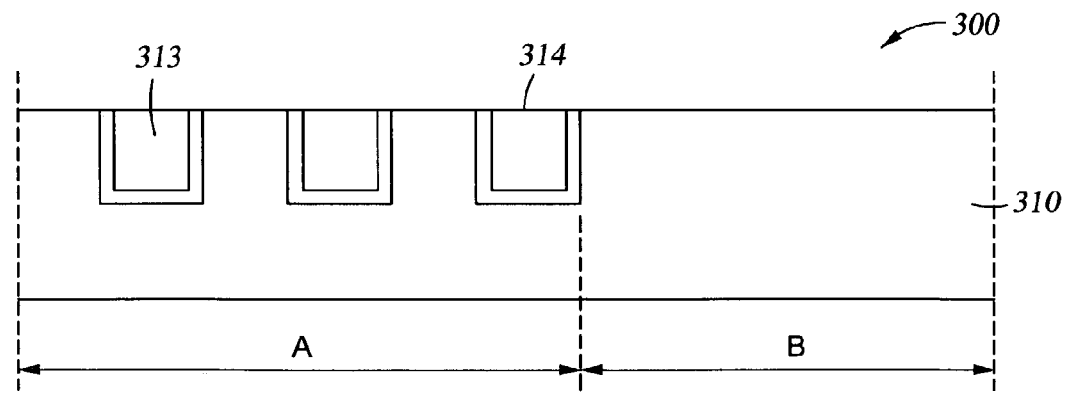

FIGS. 2–4 are schematic diagrams illustrating one embodiment of a process for forming a feature on a substrate utilizing the compositions described herein.

Referring to FIG. 2, a dielectric layer 310, such as a silicon oxide or a carbon-doped silicon oxide, is formed on a substrate 300. A plurality of openings 311 are then patterned and etched into the dielectric in area A to form features for a dense array of conductive lines with area B remaining unetched. Typically, the openings 311 are spaced apart by a distance C which can be less than about 1 micron, such as about 0.2 micron, or greater than 10 microns, such as 20 microns. The openings 311 are formed in the dielectric layer 310 by conventional photolithographic and etching techniques. A barrier layer 312 of a tantalum containing material, such as tantalum (Ta) or tantalum nitride (TaN) for a copper metallization, is deposited conformally in openings 311 and on the upper surface of the dielectric layer 310. A copper layer 313 is then deposited at a thickness (D) between about 8,000 Å and about 18,000 Å. The material deposited outside the features or overdeposited on the features to ensure fill of the features is referred to as excess material.

Referring to FIG. 3, the substrate is exposed to a CMP process employing utilizing a polishing composition to substantially remove the copper layer 313 to the barrier layer 312. A CMP composition with a high copper removal compared to removal rate of the barrier layer 312 allows for removal of substantially all of the copper layer while minimizing removal of the TaN layer. The remaining residual copper 315 is illustrated by the dashed line.

Suitable compositions for copper removal are disclosed in co-pending U.S. patent application Ser. No. 09/543,777, filed on Apr. 5, 2000, U.S. patent application Ser. No. 09/544,281, filed on Apr. 6, 2000, and U.S. patent application Ser. No. 09/608,078, filed on Jun. 30, 2000, which are incorporated herein by reference to the extent not inconsistent with the invention. An example of one composition suitable for copper removal comprises a chelating agent, an oxidizer, a corrosion inhibitor, and deionized water. The composition may further include a surfactant, a pH adjusting agent, abrasive particles, and combinations thereof. An example of the composition is between about 0.2 vol % and about 3.0 vol % of one or more amine or amide groups, such as ethylenediaminetetraacetic acid, ethylenediamine or methylformamide as a chelating agent, between about 0.5 vol % and about 8.0 vol % of hydrogen peroxide, ferric nitrate, or other compounds as the oxidizer, between about 0.02 vol % and about 1.0 vol % of any various organic compounds containing an azole group, such as benzotriazole, mercaptobenzotriazole, or 5-methyl-1-benzotriazole as the corrosion inhibitor, a pH adjusting agent to provide a pH between about 2.5 and about 11, such as potassium hydroxide (KOH), acetic acid, phosphoric acid, or oxalic acid. The bulk CMP composition may further comprise up to about 35 wt. % of abrasive particles, such as silica.

A second CMP process, or second CMP step within the CMP process, is performed utilizing a composition containing the one or more chelating agents and the one or more metal salts described herein to remove the residual copper 315. For example, the one or more chelating agents and one or more metal salts may be added to the example composition used in reference to FIG. 3 to polish the substrate surface to remove the residual copper containing material.

In one aspect of the method described herein, copper containing materials including residue material is polished in a two-step process. A CMP composition is supplied to the polishing pad for a first period of time during polishing of the substrate to remove copper containing material, and then the one or more chelating agents and one or more metal salts, such as copper salts, are mixed with the CMP composition in situ at the point of use and used with the polishing pad for a second period of time during polishing of the substrate to remove residual copper containing material.

The CMP composition may comprise one or more surfactants including a anionic surfactant, a Zweitter-ionic surfactant, a multi-ionic surfactant, or combinations thereof, a chelating agent, an oxidizer, a corrosion inhibitor, and deionized water. The composition may further include an agent to adjust the pH level, and may also include an abrasive particle concentration of about 35 wt. % or less. An example of the initial composition is between about 0.1 vol % and about 0.2 vol % of sodium polymethacrylate as a surfactant, between about 0.3 vol % and about 3 vol % of ethylenediamine as a chelating agent, between about 0.5 vol % and about 5.0 vol % hydrogen peroxide as the oxidizer, between about 0.02 vol % and about 0.1 vol % benzotriazole as the corrosion inhibitor, and phosphoric acid as the pH adjusting agent to produce a pH level between about 4 and about 8, and distilled water. The first period of time is generally between about 30 seconds and about 300 seconds, and may vary upon the CMP composition or the CMP process utilized.

After the first period of time, the one or more chelating agents, for example ethylenediamine, and the one or more metal salts, for example copper sulfate, is then added in situ with the CMP composition to have a concentration between about 0.01 vol % and about 2 vol % of ethylenediamine and a concentration between about 0.02 vol % and about 1.0 vol % of copper sulfate in the CMP composition used to treat the substrate surface. The composition and additives are used with the polishing pad to polish the substrate for a second period of time. The second period time can be for a limited duration during the polishing process or can continue until the end of the copper polishing process. If desired, the addition of the one or more chelating agents and the one or more metal salts may be discontinued before the end of the polishing process. Also, the addition of one or more chelating agents and the one or more metal salts can be discontinued and resupplied periodically during the polishing process if desired to control the polishing process.

Referring to FIG. 4, the TaN barrier layer 312 is removed and the underlying dielectric layer 310 is exposed by a polishing process. The substrate surface, including the dielectric layer, may then be buffed by techniques known in the art to remove or reduce scratching or defects formed on the substrate surface, thereby completing planarization. The resulting copper features comprises a dense array (A) of copper lines 313 bordered by open field B and the planar surface 314 of the copper metallization and substrate 300.

It has been observed that the resulting features formed with the compositions described herein exhibit reduced amounts or an absence of residual copper containing material on the barrier layer and on the copper lines, and improved planarization of the surface of the substrate after removal of the barrier layer.

The exact operative mechanism by which the inventive composition including ions of at least one transition metal and one or more chelating agents facilitates removal of the residual copper containing material with minimal or no barrier layer removal, is not known with certainty. However, it is believed that the metal salts and chelating agents enhances the initiation of chemical reactions during CMP to enhance removal of copper containing material and allow removal of the residual copper containing material. It is believed that the metal salts disassociate in the CMP composition to form metal ions which react with the chelating agents to form complexes. These complexes then react with the residual material on the substrate surface to enhance remove the residual material from the substrate.

The invention contemplates the production of ions of at least one transition metal from sources other than metal salts. For example, ions of at least one transition metal may be generated in situ at the polishing pad. In one aspect of the invention a copper retaining ring is used to secure the substrate to the carrier head. During polishing, the retaining ring contacts the polishing pad and erodes under the friction from contacting the polishing pad to produce copper ions which form part of the CMP composition. Another aspect provides for a copper sheet disposed in the polishing pad, such as a copper sheet disposed between two layers forming the polishing pad. The upper layer of the polishing pad may have grooves, perforations, or apertures which expose the underlying copper sheet to the composition. The composition may then react with the polishing sheet to disassociate copper ions from the copper sheet. The invention further contemplates other methods and apparatus which provide for the production of ions of at least one transition metal in situ during a polishing process.

The CMP composition containing the one or more chelating agents and the ions of at least one transition metal also produced an improved polish quality without detrimentally affecting the performance of the CMP composition or subsequent CMP processes. The compositions described herein have been advantageously used in removing conductive materials, such as copper, from barrier layers, such as tantalum nitride, deposited on substrate surfaces.

The invention described herein is applicable to planarizing a substrate surface during various stages of semiconductor manufacturing by any of various CMP techniques using any of various CMP systems and polishing articles, such as abrasive free compositions with conventional pads or abrasive free compositions with fixed abrasive or abrasive slurry-type pads or sheets. The invention described herein enjoys particular applicability in the manufacture of high density semiconductor devices with metal features in the deep submicron range.

While the foregoing is directed to the one or more embodiments of the present invention, other and further embodiments of the invention may be devised without departing from the basic scope thereof, and the scope thereof is determined by the claims that follow including their equivalents.

The invention claimed is:

1. A method for processing a substrate, comprising:
polishing a substrate with a first CMP composition comprising one or more chelating agents, one or more surfactants, one or more oxidizers, and one or more corrosion inhibitors;
adding ions of at least one transition metal to the first CMP composition to form a second CMP composition; and
polishing the substrate with the second CMP composition comprising ions of at least one transition metal.

2. The method of claim 1, wherein the one or more chelating agents are selected from the group consisting of compounds having one or more amine or amide groups, amino acids, carboxylic acids having one or more acid groups, and combinations thereof.

3. The method of claim 1, wherein the ions of at least one transition metal are derived from one or more metal salts.

4. The method of claim 3, wherein the one or more metal salts comprise a copper salt selected from the group consisting of copper sulfate, copper fluoborate, copper gluconate, copper sulfamate, copper sulfonate, copper pyrophosphate, copper chloride, copper cyanide, and combinations thereof.

5. The method of claim 1, wherein the one or more surfactants are selected from the group consisting of one or more anionic surfactants, Zweitter-ionic surfactants, multi-ionic surfactants, and combinations thereof.

6. The method of claim 5, wherein the anionic surfactants, Zweitter-ionic surfactants, and multi-ionic surfactants are selected from the group consisting of sodium salts of polyacrylic acid, potassium oleate, sulfosuccinates, sulfosuccinate derivatives, sulfonated amines, sulfonated amides, sulfates of alcohols, alkylanyl sulfonates, carboxylated alcohols, alkylamino propionic acids, alkyliminodipropionic acids, and combinations thereof.

7. The method of claim 5, wherein the first composition further comprises an agent to adjust the pH.

8. The method of claim 5, wherein the first composition further comprises abrasive particles.

9. The method of claim 1, wherein the substrate is polished with the first CMP composition comprising one or more chelating agents, one or more surfactants, one or more oxidizers, and one or more corrosion inhibitors to substantially remove copper containing material formed thereon.

10. The method of claim 9, wherein the substrate is polished with the second CMP composition comprising ions of at least one transition metal to remove residual copper containing material.

11. A method for processing a substrate, comprising:
polishing a substrate to substantially remove a layer of material with a CMP composition comprising one or more chelating agents, one or more surfactants, one or more oxidizers, and one or more corrosion inhibitors;
adding ions of at least one transition metal and one or more chelating agents to the CMP composition in situ after substantially removing the layer of material; and
polishing the substrate to remove a residual portion of the layer of material with the CMP composition comprising ions of at least one transition metal and one or more chelating agents.

12. The method of claim 11, wherein the one or more chelating agents are selected from the group consisting of compounds having one or more amine or amide groups, amino acids, carboxylic acids having one or more acid groups, and combinations thereof.

13. The method of claim 11, wherein the ions of at least one transition metal are derived from one or more metal salts.

14. The method of claim 13, wherein the one or more metal salts comprise a copper salt selected from the group consisting of copper sulfate, copper fluoborate, copper gluconate, copper sulfamate, copper sulfonate, copper pyrophosphate, copper chloride, copper cyanide, and combinations thereof.

15. The method of claim 11, wherein the one or more surfactants are selected from the group consisting of one or more anionic surfactants, Zweitter-ionic surfactants, multi-ionic surfactants, and combinations thereof.

16. The method of claim 15, wherein the anionic surfactants, Zweitter-ionic surfactants, and multi-ionic surfactants are selected from the group consisting of sodium salts of polyacrylic acid, potassium oleate, sulfosuccinates, sulfosuccinate derivatives, sulfonated amines, sulfonated amides, sulfates of alcohols, alkylanyl sulfonates, carboxylated alcohols, alkylamino propionic acids, alkyliminodipropionic acids, and combinations thereof.

17. The method of claim 15, wherein the composition further comprises an agent to adjust the pH.

18. The method of claim 15, wherein the composition further comprises abrasive particles.

19. The method of claim 11, wherein the substrate is polished with the CMP composition comprising one or more chelating agents, one or more surfactants, one or more oxidizers, and one or more corrosion inhibitors to substantially remove copper containing material formed thereon.

20. The method of claim 19, wherein the substrate is polished with the CMP composition comprising ions of at least one transition metal and one or more chelating agents to remove residual copper containing material.

21. A method for processing a substrate disposed on a polishing pad, comprising:
performing a first polishing process to substantially remove a layer of material on the substrate;
performing a second polishing process to remove residue material of the layer of material, comprising:
delivering a CMP composition comprising one or more chelating agents, one or more surfactants, one or more oxidizers, and one or more corrosion inhibitors to the polishing pad; and
mixing one or more chelating agents and ions of at least one transition metal in situ with the CMP composition.

22. The method of claim 21, wherein the one or more chelating agents are selected from the group consisting of compounds having one or more amine or amide groups, amino acids, carboxylic acids having one or more acid groups, and combinations thereof.

23. The method of claim 21, wherein the one or more chelating agents comprise between about 0.02 vol % and about 4 vol % of the composition.

24. The method of claim 21, wherein the layer of material is copper containing material.

25. The method of claim 21, wherein the ions of at least one transition metal are derived from one or more metal salts.

26. The method of claim 25, wherein the one or more metal salts comprise a copper salt selected from the group consisting of copper sulfate, copper fluoborate, copper gluconate, copper sulfamate, copper sulfonate, copper pyrophosphate, copper chloride, copper cyanide, and combinations thereof.

27. The method of claim 26, wherein the copper salt comprises between about 0.005 wt. % and about 1.0 wt. % of the composition.

28. The method of claim 21, wherein the one or more surfactants are selected from the group consisting of one or more anionic surfactants, Zweitter-ionic surfactants, multi-ionic surfactants, and combinations thereof.

29. The method of claim 28, wherein the anionic surfactants, Zweitter-ionic surfactants, and multi-ionic surfactants are selected from the group consisting of sodium salts of polyacrylic acid, potassium oleate, sulfosuccinates, sulfosuccinate derivatives, sulfonated amines, sulfonated amides, sulfates of alcohols, alkylanyl sulfonates, carboxylated alcohols, alkylamino propionic acids, alkyliminodipropionic acids, and combinations thereof.

30. The method of claim 28, wherein the one or more surfactants comprise between about 0.001 vol % and about 10 vol % of the composition.

31. The method of claim 28, wherein the composition further comprises an agent to adjust the pH.

32. The method of claim 31, wherein the agent to adjust the pH is an acid selected from the group consisting of acetic acid, phosphoric acid, oxalic acid, and combinations thereof.

33. The method of claim 28, wherein the composition further comprises abrasive particles.

34. The method of claim 33, wherein the abrasive particles comprise about 35 wt. % or less of the composition.

35. The method of claim 34, wherein the abrasive particles comprise materials selected from the group consisting of silica, alumina, titanium oxide, zirconium oxide, cerium oxide, and combinations thereof.

* * * * *

UNITED STATES PATENT AND TRADEMARK OFFICE
CERTIFICATE OF CORRECTION

| | | |
|---|---|---|
| PATENT NO. | : 7,022,608 B2 | Page 1 of 1 |
| APPLICATION NO. | : 10/419440 | |
| DATED | : April 4, 2006 | |
| INVENTOR(S) | : Lizhong Sun, Stan Tsai and Shijian Li | |

It is certified that error appears in the above-identified patent and that said Letters Patent is hereby corrected as shown below:

In the Specification

Column 1, Line 63: Delete the comma after "a" and before "CMP"

Column 2, Line 12: After "herein", insert --as--

Column 2, Line 45: After "formation", insert --of--

Column 2, Line 52: Change "composition" to --compositions--

Column 4, Line 12: Delete the comma after "Although"

Column 4, Lines 59, 61, and 64: Insert --more-- before "metal"

Column 5, Line 3: Insert --more-- before "metal"

Column 5, Line 60: Change "results" to --result--

Column 7, Line 63: Change "abrasives" to --abrasive--

Column 8, Line 38: Change "The" to --the--

Column 10, Line 61: Change "remove" to --removal of--

Signed and Sealed this

Twenty-second Day of August, 2006

JON W. DUDAS
*Director of the United States Patent and Trademark Office*